(12) United States Patent
Bartsch et al.

(10) Patent No.: US 9,567,932 B2
(45) Date of Patent: Feb. 14, 2017

(54) METHOD FOR OPERATING A VALVE

(71) Applicant: Robert Bosch GmbH, Stuttgart (DE)

(72) Inventors: Andreas Bartsch, Leonberg (DE); Rene Zieher, Edingen-Neckarhausen (DE); Steffen Meyer-Salfeld, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 91 days.

(21) Appl. No.: 14/406,830

(22) PCT Filed: May 14, 2013

(86) PCT No.: PCT/EP2013/059913
§ 371 (c)(1),
(2) Date: Dec. 10, 2014

(87) PCT Pub. No.: WO2013/185996
PCT Pub. Date: Dec. 19, 2013

(65) Prior Publication Data
US 2015/0167571 A1  Jun. 18, 2015

(30) Foreign Application Priority Data
Jun. 14, 2012  (DE) .................. 10 2012 209 965

(51) Int. Cl.
*F17D 3/01* (2006.01)
*F16K 31/06* (2006.01)
(Continued)

(52) U.S. Cl.
CPC ........... *F02D 41/2096* (2013.01); *F02D 41/20* (2013.01); *F02D 41/2467* (2013.01); *F02D 41/26* (2013.01);
(Continued)

(58) Field of Classification Search
CPC ................ F02D 2041/2024; F02D 2041/2027; F02D 2041/2051; F02D 2041/2058; F02D 41/2096; F02D 41/2467; F02D 41/247; H01L 41/042; H02N 2/06; H02N 2/062
See application file for complete search history.

(56) References Cited

U.S. PATENT DOCUMENTS 4,771,749 A * 9/1988 Kiuchi .................. F02D 31/002
  123/339.21
5,245,501 A * 9/1993 Locher ...................... B60T 8/36
  324/381

(Continued)

FOREIGN PATENT DOCUMENTS

DE  101 22 441   11/2002
DE  10122441 A1  11/2002
(Continued)

OTHER PUBLICATIONS

International Search Report for PCT/EP2013/059913, dated Sep. 23, 2013.

*Primary Examiner* — Marina Tietjen
*Assistant Examiner* — Seth W MacKay-Smith
(74) *Attorney, Agent, or Firm* — Norton Rose Fulbright US LLP; Gerard Messina

(57) ABSTRACT

In a method for operating a valve, one valve element of the valve being able to be moved from a first position into a second position by activating an electrically actuatable actuator, the actuator is activated at least once in a first time interval, and is thereafter not activated in a second time interval, and a signal characterizing a strike of the valve element at the first position is ascertained at electrical terminals of the actuator. During the process, an activation energy of the actuator is gradually modified, and a threshold
(Continued)

value of the activation energy at which the valve element is just able or is just no longer able to lift is ascertained.

8 Claims, 4 Drawing Sheets

(51) Int. Cl.
    *F16K 31/72*     (2006.01)
    *F02D 41/40*     (2006.01)
    *F02D 41/26*     (2006.01)
    *F02D 41/20*     (2006.01)
    *F02D 41/24*     (2006.01)
    *H02N 2/06*     (2006.01)

(52) U.S. Cl.
    CPC ......... *H02N 2/06* (2013.01); *F02D 2041/2024* (2013.01); *F02D 2041/2051* (2013.01); *Y10T 137/0318* (2015.04); *Y10T 137/86389* (2015.04)

(56) References Cited

U.S. PATENT DOCUMENTS

| | | | | |
|---|---|---|---|---|
| 5,371,427 A * | 12/1994 | Goto | .................... | G03B 7/10 310/317 |
| 5,551,480 A * | 9/1996 | Tomatsu | ............ | B60H 1/00485 137/625.29 |
| 5,687,694 A * | 11/1997 | Kanno | .................. | F02B 61/045 123/478 |
| 5,831,809 A * | 11/1998 | Schmitz | .............. | F02D 13/0253 361/154 |
| 6,253,736 B1 * | 7/2001 | Crofts | .................. | F02M 65/005 123/467 |
| 6,420,817 B1 * | 7/2002 | Ricci-Ottati | ........ | F02D 41/2096 123/498 |
| 6,498,418 B2 * | 12/2002 | Rueger | .............. | F02D 41/2096 310/316.03 |
| 6,680,620 B2 * | 1/2004 | Hedenetz | ............ | F02D 41/2096 123/498 |
| 7,413,160 B2 * | 8/2008 | Beilharz | ............. | F02D 41/2096 123/447 |
| 7,617,813 B2 | 11/2009 | Pirkl et al. | | |
| 7,815,128 B2 * | 10/2010 | Beilharz | ............. | F02D 41/2096 123/299 |
| 8,418,676 B2 * | 4/2013 | Bright | .................... | F02D 41/20 123/476 |
| 8,683,982 B2 * | 4/2014 | Bright | ................ | F02M 51/0603 123/490 |
| 8,863,727 B2 | 10/2014 | Jalal et al. | | |
| 9,200,580 B2 | 12/2015 | Brandt | | |
| 9,316,478 B2 * | 4/2016 | Wirkowski | ............. | F02D 41/20 |
| 2005/0121535 A1 * | 6/2005 | Pirkl | ................... | F02D 41/2096 239/5 |
| 2005/0225201 A1 * | 10/2005 | Vogeley | ................ | H01L 41/042 310/317 |
| 2006/0201488 A1 * | 9/2006 | Kohler | .................... | F02D 41/20 123/479 |
| 2009/0223490 A1 | 9/2009 | Pirkl et al. | | |
| 2010/0275885 A1 * | 11/2010 | Becker | ................ | F02D 41/2096 123/478 |
| 2012/0013325 A1 * | 1/2012 | Tonner | ................ | F02D 41/2096 324/109 |
| 2012/0031378 A1 | 2/2012 | Brandt | | |
| 2012/0048239 A1 | 3/2012 | Jalal et al. | | |
| 2013/0226488 A1 * | 8/2013 | Wirkowski | .......... | F02M 59/466 702/64 |
| 2014/0346244 A1 * | 11/2014 | Russe | ................. | F02D 41/2096 239/4 |
| 2015/0040869 A1 * | 2/2015 | Filippi | ................ | F02M 65/005 123/472 |

FOREIGN PATENT DOCUMENTS

| | | |
|---|---|---|
| DE | 10 2009 018289 | 6/2010 |
| DE | 102011007580 | 10/2012 |
| DE | 102011075733 | 11/2012 |
| EP | 1 887 205 | 2/2008 |
| JP | 2005-504912 A | 2/2005 |
| JP | 2006-507443 A | 3/2006 |
| JP | 2007-506888 A | 3/2007 |
| JP | 2008-031993 A | 2/2008 |
| JP | 2010-275987 A | 12/2012 |
| WO | WO 2009/138422 | 11/2009 |

\* cited by examiner

METHOD FOR OPERATING A VALVE

BACKGROUND OF THE INVENTION

1. Field of the Invention

The present invention relates to a method, a control unit, and a computer program for operating a valve.

2. Description of the Related Art

Fuel injectors for internal combustion engines which are actuatable with the aid of an electromagnetic actuation unit or a piezoelectric actuator are known from the market. Particularly the technical properties of piezoelectric actuators may be scattered due to material properties, manufacturing processes and the influence of lots. This also applies to the energy requirement necessary for the activation of the piezoelectric actuator.

For example, the energy requirement of the piezoelectric actuator may be ascertained in a testing process during the manufacturing of the valve or the fuel injector. The thus ascertained activation energy may then be specifically assigned to the particular specimen of the fuel injector with the aid of a code.

BRIEF SUMMARY OF THE INVENTION

The present invention relates to a method for operating a valve, one valve element of the valve being able to be moved from a first position into a second position by activating an electrically actuatable actuator. According to the present invention, the actuator is activated at least once in a first time interval, and is thereafter not activated in a second time interval, a signal characterizing a strike of the valve element at the first position being ascertained at electrical terminals of the actuator. Furthermore, an activation energy of the actuator is gradually modified, a threshold value of the activation energy ("energy requirement") being ascertained, at which the valve element is just able or is just no longer able to lift. The threshold value describes a limit case for the activation of the actuator; the valve element is moved and the valve may, if necessary, open or close, when the threshold value is exceeded. The gradual "modification" of the activation energy may include a gradual decrease and/or a gradual increase of the activation energy. This characterizes a first aspect of the method according to the present invention. This ascertainment according to the present invention of the actual energy requirement of the actuator may advantageously take place periodically in order to ascertain an energy requirement which varies as a function of the period of operation of the valve. Aging effects, wear, etc. may be deduced advantageously from this.

A second, optional aspect of the present invention takes place during the continued operation of the valve, the threshold value of the activation energy or the energy requirement ascertained in the first part being used as a reference value, and any activation energy exceeding the threshold value being capable of opening or closing the valve by a defined degree. The method may particularly be used for operating cases in which the valve is to be opened or closed by a certain degree for a relatively brief period and/or by a relatively small degree. This means that, based on an actual energy requirement previously ascertained according to the present invention, an activation energy and/or further activation parameters (electric voltage/current and/or activation period) may be ascertained for a future activation of the actuator, so that the actual energy requirement or wear may be taken into account during the future activation.

The valve may be actuatable directly by the actuator in a first embodiment, or it may be actuatable indirectly in a second embodiment in that the valve is designed as a servo valve. The electrical activation energy is fed to the actuator, for example, by temporarily connecting the actuator to a voltage or by injecting a current. The voltage level or the current level determines the respective activation energy. Alternatively or additionally, the activation period may also be modified.

The present invention has the advantage that the threshold value of the activation energy, i.e., the energy requirement, which characterizes the operation of the actuator or the piezoelectric actuator, may be individually ascertained in the operationally installed state of the valve. An ascertainment of the activation energy during the manufacturing of the fuel injector may generally be dispensed with. Furthermore, the threshold value of the activation energy may be ascertained occasionally or periodically during operation of the valve, thus making a simple and exact correction of the threshold value—and thus the activation energy—over the service life of the valve possible.

Another embodiment of the method provides for the first position to correspond to the closed valve, and for the second position to correspond to the open valve. The consequences are generally greater when the valve opens by only a small degree than when the valve closes by a small degree. For this reason, the precision achievable according to the present invention is particularly advantageous in the case of the valve opening briefly and/or by a small degree.

Furthermore, it may be provided that an activation period of the electrically actuatable actuator is maintained at a constant level, and that an activation voltage of the electrically actuatable actuator is gradually or—if possible—continuously or quasi-continuously modified. In this way, a particularly simple and precise ascertainment of the energy requirement on the one hand, and an activation of the actuator on the other hand, are made possible.

The method according to the present invention may be carried out particularly easily and precisely for such valves, where a signal characterizing a strike of the valve element at the first position essentially corresponds to a jump function. A jump function may relatively easily be differentiated from possibly superimposed other signals, and also makes it possible to unambiguously ascertain a point in time of the stop of the valve element. Instead of a jump function, a signal variation over time is also possible, in which a variation over time (e.g. first derivation over time) of the signal exceeds a predefinable threshold value.

The method is particularly useful when the electrically actuatable actuator is a piezoelectric actuator. When a piezoelectric actuator is used, the geometry, particularly a measure of length, is modified as a function of the activation energy. As a consequence of material properties, manufacturing influences or changes during the service life, the properties of piezoelectric actuators may be comparatively widely scattered. Similarly, other elements of the valve on which the piezoelectric actuator impacts directly or indirectly may be individually of importance for the required activation energy of the piezoelectric actuator. Despite these influences and modifications, the present invention may check and, if necessary, correct the lifting of the valve element from the first position, and thus the function of the valve.

In one preferred embodiment, the valve is a fuel injector of an internal combustion engine. The fuel injector is opened comparatively briefly or by a comparatively small degree in particular during pre-injections or post-injections. Thanks to the present invention, the fuel quantity injected during this process may be measured particularly accurately, because the energy requirement which is just sufficient for opening the valve from its closed position is always known.

In another embodiment, the valve or the fuel injector includes a servo valve. Here, a valve element of the servo valve is moved with the aid of the actuator or the piezoelectric actuator. With the method according to the present invention, the operation of the servo valve and thus of the entire valve or fuel injector may be checked and adjusted particularly precisely.

The ascertained threshold value is preferably stored in a data memory, where the stored threshold value may subsequently be taken into account for measuring the activation energy. Based on the ascertained threshold value, the activation energy may be increased, a correlation between a respective increase of the activation energy and the injected fuel quantity being particularly precise. According to another specific embodiment, the ascertained energy requirement may also be used for diagnostic purposes. For example, an error reaction may be initiated when the energy requirement according to the present invention exceeds a predefinable threshold.

In another advantageous embodiment of the present invention, the method is carried out with the aid of a control and/or regulating unit for the internal combustion engine. Variables or values relevant to the injection, which may thus be used by the method, are centrally present in the control and/or regulating unit. The method according to the present invention is preferably at least in part carried out with the aid of a computer program, which is programmed for carrying out the method.

Examples of specific embodiments of the present invention are described below, with reference to the drawings.

DETAILED DESCRIPTION OF THE INVENTION

Figure 1:
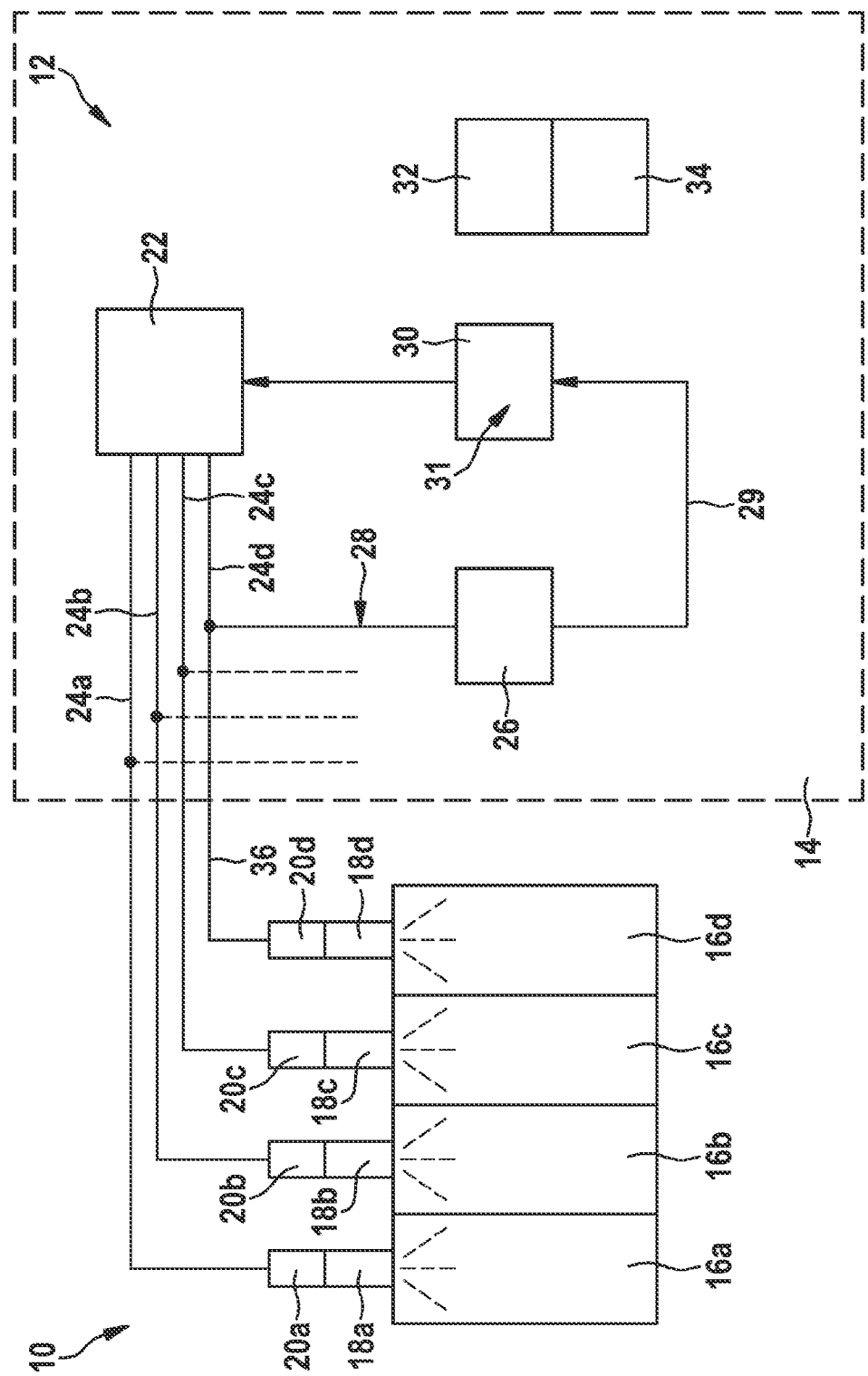
FIG. 1 shows a simplified diagram of an internal combustion engine and a control and evaluation unit.

In all figures the same reference numerals are used for elements and variables similar in function, also in different specific embodiments.

FIG. 1 shows a highly simplified diagram of internal combustion engine 10 of a motor vehicle together with a control and evaluation unit 12. Presently, control and evaluation unit 12 is part of control and/or regulating unit 14 of internal combustion engine 10. Internal combustion engine 10 in FIG. 1 includes four cylinders 16a through 16d, in addition four fuel injectors 18 and four electrically actuatable actuators 20, which are connected to control and evaluation unit 12. Actuators 20 are electrically actuatable operating units of fuel injectors 18 and are, for example, designed as piezoelectric actuators 42 (see FIG. 2). Fuel injectors 18 or actuators 20 are presently differentiated by reference numerals 18a through 18d and 20a through 20d.

Control and evaluation unit 12 includes activation module 22, which may activate four fuel injectors 18 with the aid of activation lines 24a through 24d. As an example, in FIG. 1, actuator 20d is connected to an evaluation unit 26, which receives signal voltage 28 from activation line 24d. Evaluation unit 26 is connected with a data memory 30 via electrical line 29. Threshold values 31 of an activation energy, which characterize the operation of fuel injectors 18, may be stored in data memory 30. This is elucidated in greater detail further below. Furthermore, control and evaluation unit 12 or control and/or regulating unit 14 includes processor 32 and computer program 34.

The wiring of remaining activation lines 24a through 24c is only symbolically indicated in FIG. 1 with one short, vertical, dashed line each (without reference numeral). The wiring of activation line 24a through 24c corresponds, however, to the wiring of activation line 24d described above.

During operation of internal combustion engine 10, activation module 22 successively activates actuators 20a through 20d. For example, actuator 20d is activated using electrical activation signal 36 via activation line 24d for a predefined activation period and with a predefined activation energy. Thereupon, associated fuel injector 18d opens and injects a fuel quantity into a combustion chamber of cylinder 16d. After the activation period has elapsed, activation module 22 switches off electrical activation signal 36.

It is understood that control and evaluation unit 12 shown in FIG. 1 may be designed in almost any conceivable way. For example, the elements shown may also be distributed in different devices of internal combustion engine 10 or the motor vehicle, and/or they may be designed to any conceivable degree as electrical circuits or be operated by computer program 34. Fuel injectors 18 may, in a first embodiment, be designed in such a way that actuators 20 may actuate a respective valve element 56 (see FIG. 2) with the aid of servo valve 38 integrated into the respective fuel injector 18 (see FIG. 2). In an alternative second embodiment, actuators 20 may actuate respective valve element 56 without using servo valve 38, as is explained below with reference to FIG. 2. Furthermore, the method according to the present invention is not limited to the use of piezoelectric actuators 42.

Figure 2:
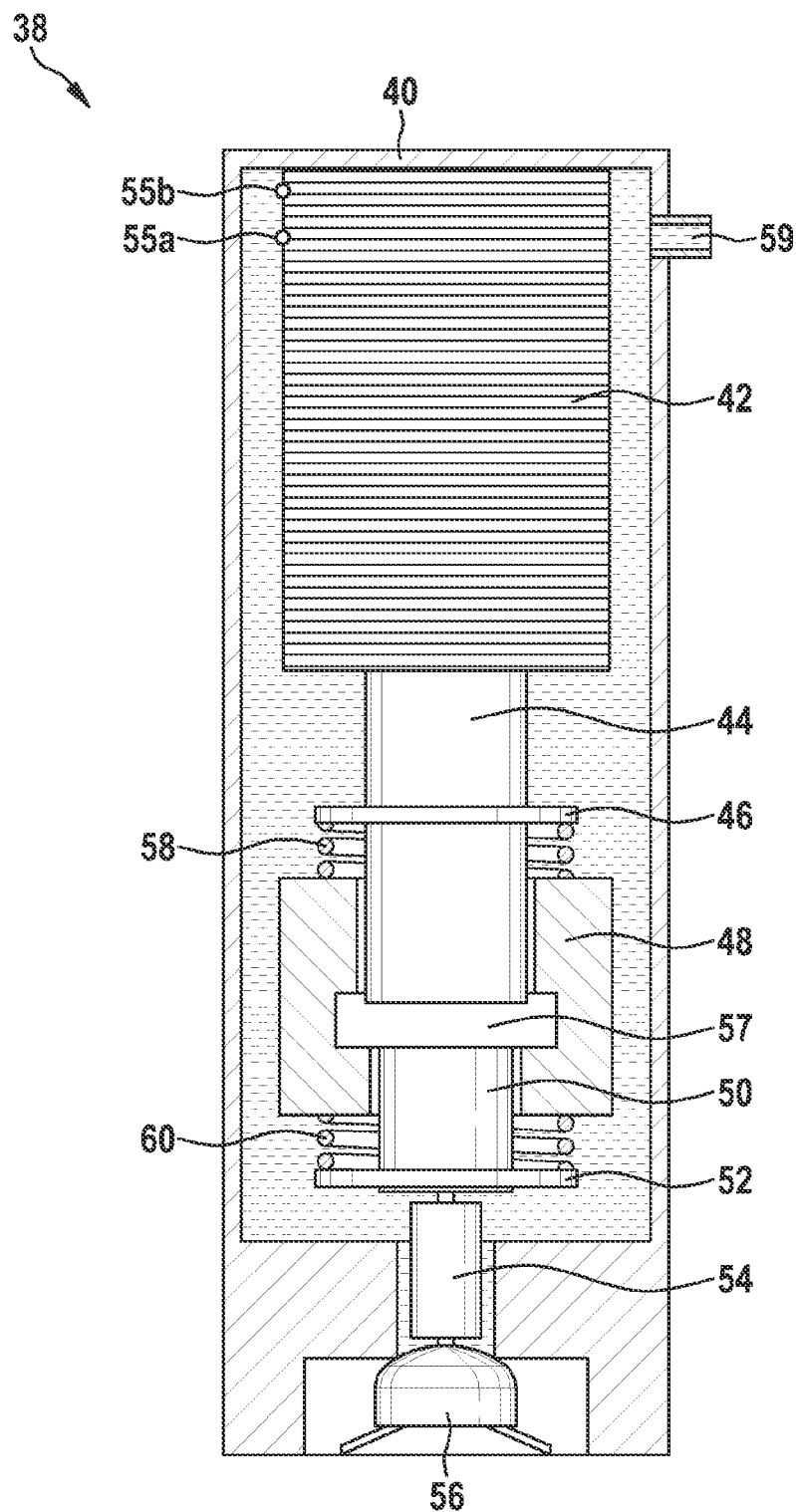
FIG. 2 shows a simplified diagram of a valve.

FIG. 2 shows a simplified diagram of servo valve 38, which may be integrated into fuel injectors 18. Servo valve 38 presently includes a housing 40. In the drawing, the following is shown from top to bottom within housing 40: Piezoelectric actuator 42 situated at a section of housing 40, a first tappet 44, a first plate 46, a hydraulic coupler 48, a second tappet 50, a second plate 52, a third tappet 54 and valve element 56 mentioned above. Piezoelectric actuator 42 includes two electrical terminals 55a and 55b, which are used to feed an electrical activation energy to piezoelectric actuator 42.

A hydraulic pressure chamber 57 is situated between a lower end section of the first tappet 44 in the drawing and an upper end section of the second tappet 50 in the drawing. A fluid chamber (without reference numeral) enclosed by housing 40 is situated in the upper right of the drawing, which is connected to a hydraulic low-pressure-area (not shown) with the aid of a fluid line 59.

First, second and third tappet 44, 50 and 54 each have an approximately cylindrical geometry. Valve element 56 has an approximately hemispherical geometry. A first coil spring 58 is situated between first plate 46 and hydraulic coupler 48, and a second coil spring 60 is situated between second plate 52 and hydraulic coupler 48.

FIG. 2 shows valve element 56 in a first—in the drawing, upper—position. The first position corresponds presently to closed servo valve 38. Here, an upper sealing section in the drawing of valve element 56 is situated adjoining to a sealing seat (without reference numeral) of housing 40. A transmission of power is possible between piezoelectric actuator 42 and valve element 56 with the aid of first, second and third tappet 44, 50 and 54 as well as with the aid of hydraulic pressure chamber 57. In this way, valve element 56 may be moved downward in the drawing into a second position (not shown), which, for example, corresponds to an open position of servo valve 38.

During operation of servo valve 38, activation energy is supplied to piezoelectric actuator 42 with the aid of an electric current. In this way, piezoelectric actuator 42 extends—vertically in the drawing—which respectively moves first tappet 44, which is connected to piezoelectric actuator 42, down in the drawing. With the aid of a resulting increase in pressure in hydraulic pressure chamber 57, second and third tappet 50 and 54 as well as valve element 56 are then acted upon. If the activation energy of piezoelectric actuator 42 is greater than threshold value 31, which is dependent on the design of servo valve 38, of hydraulic pressures and specimen-dependent tolerances, valve element 56 may lift from the sealing seat and thus at least briefly open servo valve 38.

It should be pointed out that valve element 56 of servo valve 38 hydraulically activates a valve body not shown in FIG. 2, for example a valve needle, with the aid of which fuel may be injected into a combustion chamber of cylinder 16. If fuel injector 18 is a direct fuel injector 18, valve element 56 corresponds to the mentioned valve body or the valve needle.

Figure 3:
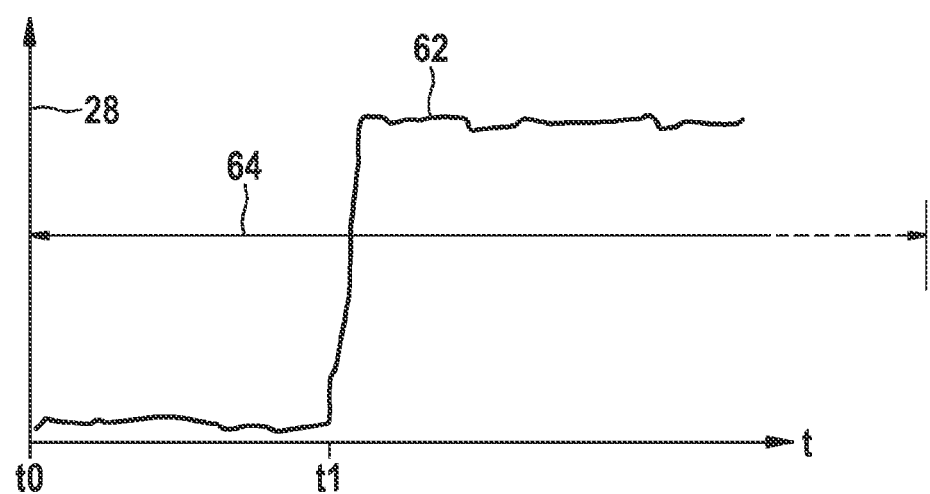
FIG. 3 shows a time diagram with a signal of an electrically actuatable actuator.

FIG. 3 shows a time diagram of a signal 62, which may be ascertained between terminals 55a and 55b of piezoelectric actuator 42. In the coordinate system shown in the drawing, time t is plotted on the abscissa, and signal voltage 28 is plotted on the ordinate. The point of coordinate origin characterizes a point in time t0, at which an activation (energization) by activation module 22 is stopped. Point in time t0 thus characterizes the beginning of a time interval 64, in which actuator 20 is not activated. According to the method, actuator 20 is activated at least once in a first time interval prior to point in time t0, and subsequently not activated in second time interval 64. At point in time t0, piezoelectric actuator 42 has the largest extension and valve element 56 is lifted at least by a small degree from its sealing seat.

As a consequence of the hydraulic pressures prevailing in servo valve 38, valve element 56 is pressed upward after the end of the activation in the drawing of FIG. 2 and strikes against its sealing seat at a point in time t1. This impact is transmitted at least in a weakened form to piezoelectric actuator 42 due to the transmission of power described in FIG. 2. In this way, signal 62 exhibits an approximately abrupt change (jump function) at point in time t1.

The curve shown in FIG. 3 of signal 62 may, if necessary, be superimposed by potential electrical interfering signals and/or transient reactions or the like. These interfering superimpositions in signal voltage 28 are, however, not shown in the drawing.

Based on an electrical activation energy of piezoelectric actuator 42 which is sufficiently high to temporarily lift the valve element 56 from its sealing seat and thus generate signal 62 similarly to FIG. 3, the activation may be gradually decreased. This takes place, for example, by keeping an activation period of piezoelectric actuator 42 constant and gradually decreasing an associated amplitude of a pulsed activation voltage between terminals 55a and 55b. Similarly, the respective maximum extension of piezoelectric actuator 42 is gradually decreased.

This results in point in time t1, which is shown in FIG. 3, occurring gradually sooner. At the same time, valve element 56 may strike against its sealing seat similarly more weakly, an amplitude of signal 62 respectively becoming similarly smaller. Due to the gradual ascertainment of point in time t1, threshold value 31 of the activation energy ("energy requirement") may be ascertained, at which valve element 56 is just able or is just no longer able to lift.

Alternatively or in addition, threshold value 31 may also be ascertained by, based on a very low or even disappearing activation energy, gradually increasing the activation energy until signal 62 is first ascertainable.

Figure 4:
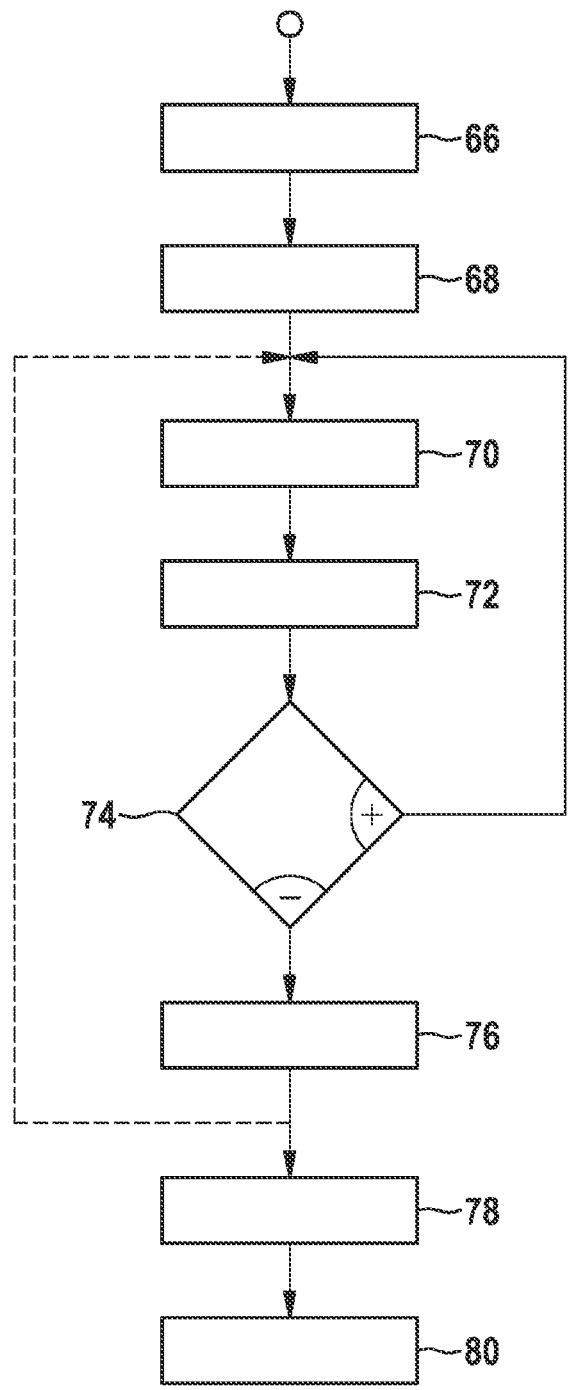
FIG. 4 shows a flow chart for a method for operating the valve.

FIG. 4 shows a flow chart for carrying out a method for operating fuel injector 18 or servo valve 38. The process shown in the drawing may, for example, be processed by processor 32 with the aid of computer program 34.

The process shown in FIG. 4 starts in a starting block 66. In a subsequent block 68, a first activation energy is set for piezoelectric actuator 42, which enables valve element 56 to lift from its sealing seat. In a subsequent block 70, the level of the activation voltage is decreased by one step. In a subsequent block 72, signal 62 is ascertained at terminals 55a and 55b of piezoelectric actuator 42, and a difference is formed between points in time t1 and t0. The latter may also be advantageous for plausibility checking of the method and for the certain detection of signal 62.

In a subsequent query block 74, it is checked whether signal 62 and/or point in time t1 is/are still ascertainable, or if an amplitude of signal 62 exceeds a predefined limiting value. If this is the case, the sequence branches back to the beginning of block 70. If this is not the case, it may be deduced that the last set activation energy reached threshold value 31, at which valve element 56 is just able or is just no longer able to lift from the first position. The program then branches off to a subsequent block 76.

In block 76, the ascertained threshold value 31 of the activation energy is stored permanently in data memory 30 for the respective fuel injector 18. The procedure may then be carried out for remaining fuel injectors 18 of internal combustion engine 10 in a similar manner. This is shown in the drawing by a dashed line.

In subsequent block 78, the ascertained threshold values 31 may be retrieved from data memory 30 during further operation of internal combustion engine 10 and be used as a reference value (base value, benchmark) for the activation of fuel injectors 18 or piezoelectric actuators 42. Activating fuel injectors 18 may thus be carried out particularly precisely, in particular for operating cases in which only small quantities of fuel are to be injected into combustion chambers of cylinders 16 for a pre-injection and/or post-injection.

The process described in FIG. 4 ends in a following end block 80. Preferably, the ascertainment of threshold value 31 may be carried out during operation of internal combustion engine 10 or during driving of the motor vehicle, for example, during a no-load operation or a coasting operation of internal combustion engine 10. In particular, possible modifications of threshold value 31 may thus be ascertained over the service life of fuel injector 18 and compensated for.

What is claimed is:

1. A method for operating a valve having one valve element configured to be selectively moved from a first position into a second position by activating an electrically actuatable actuator, the method comprising:
   setting a first activation energy for the actuator, which enables valve element to lift from its sealing seat;
   actuating the actuator at least once in a first time interval prior to an initial time;

subsequently not activating the actuator in a second time interval following the initial time;

ascertaining, at electrical terminals of the actuator, a signal characterizing a strike of the valve element at the first position at a strike time; and gradually modifying an activation energy of the actuator, so that the strike time occurs gradually sooner, and ascertaining a threshold value of the activation energy at which the valve element is one of just able or just no longer able to lift from the first position;

wherein the first position corresponds to a closed position of the valve and the second position corresponds to an opened position of the valve, and wherein an activation period of the electrically actuatable actuator is held at a constant level, and an activation voltage of the electrically actuatable actuator is gradually modified.

2. The method as recited in claim 1, wherein the signal essentially corresponds to a jump function.

3. The method as recited in claim 1, wherein the electrically actuatable actuator is a piezoelectric actuator.

4. The method as recited in claim 3, wherein the valve is a fuel injector for an internal combustion engine.

5. The method as recited in claim 4, wherein the valve includes a servo valve.

6. The method as recited in claim 1, wherein the ascertained threshold value is stored in a data memory, and wherein the stored threshold value is subsequently taken into consideration for measuring the activation energy.

7. A regulating device for regulating the operation of a valve having one valve element configured to be selectively moved from a first position into a second position by activating an electrically actuatable actuator, comprising:

a control unit including a processor configured to perform the following:

set first activation energy for the actuator, which enables valve element to lift from its sealing seat;

actuate the actuator at least once in a first time interval prior to an initial time;

subsequently not activate the actuator in a second time interval following the initial time;

ascertain, at electrical terminals of the actuator, a signal characterizing a strike of the valve element at the first position at a strike time; and gradually modify an activation energy of the actuator, so that the strike time occurs gradually sooner, and ascertain a threshold value of the activation energy at which the valve element is one of just able or just no longer able to lift from the first position;

wherein the first position corresponds to a closed position of the valve and the second position corresponds to an opened position of the valve, and wherein an activation period of the electrically actuatable actuator is held at a constant level, and an activation voltage of the electrically actuatable actuator is gradually modified.

8. A non-transitory, computer-readable data storage medium storing a computer program, which is executable by a computer, comprising:

a program code arrangement having program code for operating a valve having one valve element configured to be selectively moved from a first position into a second position by activating an electrically actuatable actuator, by performing the following:

setting a first activation energy for the actuator, which enables valve element to lift from its sealing seat;

actuating the actuator at least once in a first time interval prior to an initial time;

subsequently not activating the actuator in a second time interval following the initial time;

ascertaining, at electrical terminals of the actuator, a signal characterizing a strike of the valve element at the first position at a strike time; and gradually modifying an activation energy of the actuator, so that the strike time occurs gradually sooner, and ascertaining a threshold value of the activation energy at which the valve element is one of just able or just no longer able to lift from the first position;

wherein the first position corresponds to a closed position of the valve and the second position corresponds to an opened position of the valve, and wherein an activation period of the electrically actuatable actuator is held at a constant level, and an activation voltage of the electrically actuatable actuator is gradually modified.

* * * * *